United States Patent [19]
Inabata et al.

[11] Patent Number: 6,073,155
[45] Date of Patent: Jun. 6, 2000

[54] FLOATING-POINT ACCUMULATOR

[75] Inventors: Shinjiro Inabata; So Yamada; Shinjiro Toyoda; Nobuaki Miyakawa, all of Ebina, Japan

[73] Assignee: Fuji Xerox Co., Ltd., Tokyo, Japan

[21] Appl. No.: 08/901,671

[22] Filed: Jul. 28, 1997

[30]     Foreign Application Priority Data

Aug. 8, 1996   [JP]   Japan ................................... 8-209836

[51] Int. Cl.[7] ..................................................... G06F 7/38
[52] U.S. Cl. ........................................... 708/490; 708/495
[58] Field of Search ........................ 364/736.01–736.03, 364/750.5, 748.01, 748.11; 708/490, 495

[56]         References Cited

U.S. PATENT DOCUMENTS

| | | | |
|---|---|---|---|
| 4,945,506 | 7/1990 | Baji et al. ................................ | 708/520 |
| 4,949,292 | 8/1990 | Hoshino et al. ........................ | 708/520 |
| 5,018,092 | 5/1991 | Hashimoto ........................ | 364/736.01 |
| 5,307,300 | 4/1994 | Komoto ................ | 364/736.01 |
| 5,359,548 | 10/1994 | Yoshizawa et al. ..................... | 708/505 |
| 5,757,685 | 5/1998 | Ohuchi ................................ | 364/736.01 |

FOREIGN PATENT DOCUMENTS

| | | |
|---|---|---|
| 1-169627 | 7/1989 | Japan . |
| 4-281524 | 10/1992 | Japan . |
| 5-158656 | 6/1993 | Japan . |

*Primary Examiner*—Tan V. Mai
*Attorney, Agent, or Firm*—Oliff & Berridge, PLC

[57]         ABSTRACT

To obtain the sufficiently precise result of floating-point accumulation even if the quantity of computation is enormous, a floating-point accumulator according to the present invention is constituted as follows:

When two floating-point data are stored in any of shift registers, the two data are respectively output to BUS0 and BUS1 via one connected to the shift register of buffers. The two output data are input to an adder via BUS0 and BUS1 and output as added result data after adding the floating-point numbers. The above added result data is returned to each input of the shift registers via BUSW and a multiplexer and written into the shift register corresponding to the addition of the higher level by one of the shift register holding floating-point data before addition. The floating-point numbers are accumulated by repeating the above operation.

4 Claims, 11 Drawing Sheets

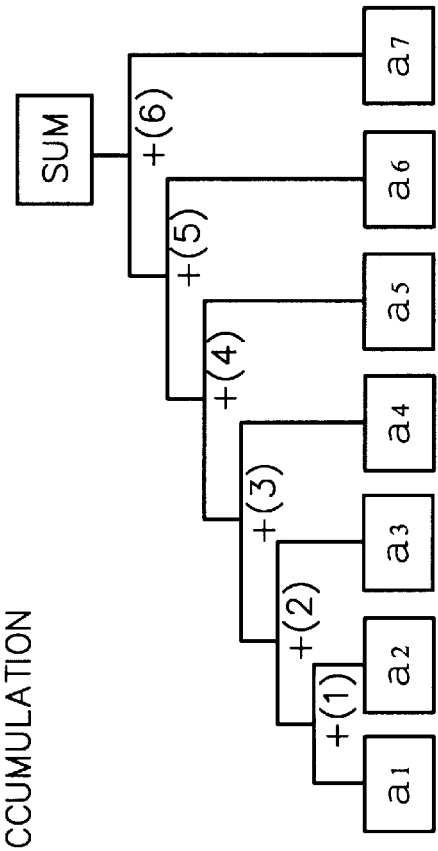
Fig. 3 (A) ORDER OF PRIOR ACCUMULATION
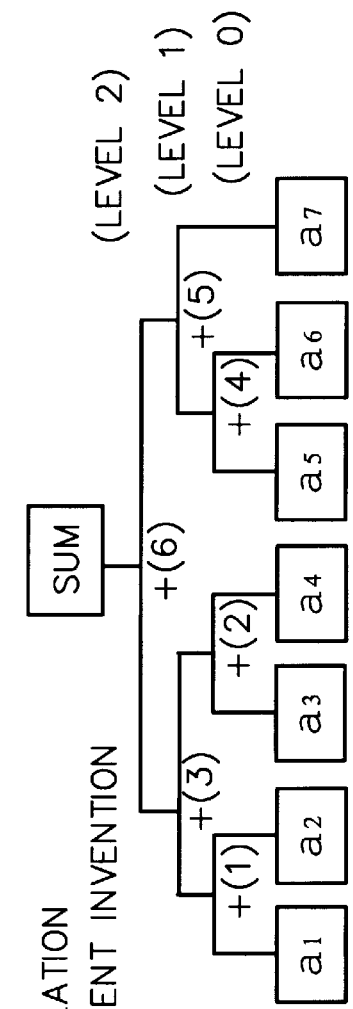
Fig. 3 (B) ORDER OF ACCUMULATION ACCORDING TO PRESENT INVENTION

Fig. 4

RESULT OF COMPARING RELATIVE ERRORS IN
PRIOR EXAMPLE AND PRESENT INVENTION

| $N = 2^m$ | RELATIVE ERROR IN PRIOR EXAMPLE $(1 + 2^{-2p})^N - 1 \sim (1 - 2^{-2p})^N - 1$ | RELATIVE ERROR IN PRESENT INVENTION $(1 + 2^{-p})^m - 1 \sim (1 - 2^{-p})^m - 1$ |
|---|---|---|
| $2^{20}$ (APPROX. ONE MILLION) | $-2.44e-4 \sim 2.44e-4$ | $-3.05e-4 \sim 3.05e-4$ |
| $2^{22}$ (APPROX. FOUR MILLION) | $-9.76e-4 \sim 9.76e-4$ | $-3.36e-4 \sim 3.36e-4$ |
| $2^{24}$ (APPROX. SIXTEEN MILLION) | $-3.90e-3 \sim 3.91e-3$ | $-3.66e-4 \sim 3.66e-4$ |
| $2^{26}$ (APPROX. SIXTY-SEVEN MILLION) | $-1.55e-2 \sim 1.57e-2$ | $-3.97e-4 \sim 3.97e-4$ |
| $2^{28}$ (APPROX. TWO HUNDRED SIXTY MILLION) | $-6.06e-2 \sim 6.45e-2$ | $-4.27e-4 \sim 4.27e-4$ |

HOWEVER, p SHALL BE 16 BITS

FLOATING-POINT ACCUMULATOR

BACKGROUND OF THE INVENTION

1. Field of the Invention

The present invention relates to a floating-point accumulator, particularly relates to an accumulator applied in the simulation of signal processing and a physical phenomenon and others for accumulating a floating-point number with limited word length.

2. Description of the Related Art

An accumulator has been widely used in the field of image processing and others. For example in a digital filter, an accumulator is used for an operation of multiplying each of plural pixel values by a specific coefficient and accumulating data after multiplication.

Heretofore, such an accumulator is constituted by a register 111 for holding data and an adder 110 for adding input data to be accumulated and data held in the register 111 as the result of addition as shown in FIG. 11 and data is accumulated in the order of input.

That is, as shown in FIG. 11, data to be accumulated is input from input 100 in order in synchronization with a clock signal not shown and the register 111 holds data added by the adder 110 in synchronization with this clock signal. At this time, the data input from the input 100 is added by the adder 110 to the data held in the register 111 and the sum is again stored in the register 111. As described above, input data is directly added to accumulated data in order, stored in the register 111 and when accumulation is finished, the result of the accumulation is output from output 101.

However, if floating-point data the word length of which is fixed is accumulated as described above, a problem that the precision of the result of accumulation is deteriorated due to a rounding error caused by rounding down, rounding up and rounding off occurs. Particularly, if the difference between the exponent of an added result and that of input data is great, the number of bits included in the added result exceeds the range of that of bits represented by a floating-point number and the precision is deteriorated. If many small numbers are input next to a large number, the sum is finally an unallowable value in view of the precision of calculation because the errors of the above numbers are accumulated.

The above phenomenon will be described, giving a case that 257 pieces of numbers represented by a floating-point number are accumulated as an example. A floating-point number is represented by the following format: First, a word is separated and a sign part, a fixed-point part and a characteristic are separately stored. The absolute value of a number is stored in the fixed-point part consisting of 8 bits, the most significant bit (MSB) of the fixed-point part is always set to '1' so as to simplify description and a number the MSB of the fixed-point part of which is '0' shall not be considered. The sign of a floating-point number is specified by a bit of the sign part. Further, the characteristic is represented by sign digits consisting of 5 bits for example and an exponent when a base is '2' is held in the characteristic. An accumulated value 'sum' is obtained by calculating the following expression:

$$\text{sum} = \Sigma a(i), \, i=1 \text{ to } 257.$$

However, $a(1)=2^{-1}$, $a(2)=a(3)= \ldots =a(257)=2^{-9}$.

The precise result of the above calculation is 1 as follows:

$$\text{sum}=2^{-1}+2^{-9}\times 256 = 2^{-1}+2^{-9}\times 2^{8} = 2^{-1}+2^{-1}=1.$$

In the meantime, in case the above calculation is executed in a circuit shown in FIG. 11, the fixed-point part of floating-point data with the smaller characteristic is first shifted by the difference between both exponents toward the least significant bit (LSB) in the adder 110 so as to align the points of two inputs because data a(i) is input in order from the input 100 and added by the adder 110. Bit data exceeding the area consisting of 8 bits in the fixed-point part is truncated by the above shift. Next, the numbers which both consist of 8 bits are added to obtain the added result consisting of 9 bits. Afterward, the added result is shifted so that MSB is '1' to obtain the added result. Therefore, when the MSB of the added result consisting of 9 bits is '1', the added result is shifted by one bit toward LSB. At this time, the LSB of 9-bit data before shift is truncated because the data exceeds an area consisting of 8 bits.

The above description will be described further in detail below. As the data a(2) and the following data are input in order from the input 100 after the data a(1) is input from the input 100 and stored in the register 111, the data a(1) which is $2^{-1}$ and stored in the register and the data a(2) which is $2^{-9}$ and next input are added according to the above addition procedure in the adder 110 when the data a(2) is input.

In the fixed-point part of $2^{-9}$, only MSB is '1' and the residual bits are all '0'. In the characteristic of the above value $2^{-9}$, the bits are shifted by 8 bits toward LSB before addition because the difference between the exponent of $2^{-9}$ and that of $2^{-1}$ is 8. However, as the fixed-point part consists of 8 bits, '1' in MSB is truncated because it exceeds the fixed-point part because of the shift and all bits in the fixed-point part are '0'. As described above, if values in the characteristics of the added two data are greatly different, the precision of data the value of which is small is deteriorated because of a shift operation. As a result, the first added result is $2^{-1}$ as a result of adding $2^{-1}$ and 0 and $2^{-1}$ is stored in the register 111.

Afterward, as the same value $2^{-1}$ as the data a(1) is stored in the register 111 although the data a(3) and the following data which have the same value as the data a(2) are input in order from the input 100, two data input to the adder 110 are the same values as in case the data a(1) and a(2) are added. As a result, the added result is also the same as that of the data a(1) and a(2) and a value $2^{-1}$ stored in the register 111 is unchanged.

Therefore, after 257 pieces of data are input from the input 100 and accumulation is finished, $2^{-1}$ is output as an accumulated value from an output 101. The above value is a half of the above precise value.

The above phenomenon will be further analytically examined below. First, if a fixed-point part consists of p bits, a relative error er ($|er| \leq 2^{-p}$) occurs in one floating-point adding operation. If floating-point addition by the above accumulator is represented as +' and precise addition (addition in an ideal state in which no error occurs) is represented as +, the addition of a and b by the accumulator is represented in the following expression:

$$a +' b = (1+er)(a+b) = (1+er) \, a + (1+er) \, b.$$

That is, the result of one floating-point addition is a value in which the respective relative errors er of a and b are added to a value obtained by adding a and b differently from the precisely added result.

According to the above expression, an error in case N pieces of numbers a1 to aN are accumulated using the accumulator shown in FIG. 11 will be analyzed below. In this case, the following expression is effected because floating-point addition is executed (N−1) times:

$$( \ldots ((a1 +' a2) +' a3) +' \ldots +' aN) =$$

$(1+er)(\ldots(1+er)((1+er)(a1+a2)+a3)+\ldots+aN)=$ $(1+er)^{N-1}a1+(1+er)^{N-1}a2+(1+er)^{N-2}a3+(1+er)^{N-3}a4+\ldots+(1+er)aN.$ That is, for a1 and a2 of N pieces of numbers when the above expression is represented in the form of the precise sum of the N pieces of numbers, the relative error of "$(1+er)^{N-1}-1$" is included in each, as a result, the maximum relative error is "$(1+2^{-p})^{N-1}-1$" and the minimum relative error is "$(1-2^{-p})^{N-1}-1$".

In the above example, as N=257 and p=8, the maximum relative error of a first input value is "$(1+2^{-8})^{256}-1=1=1.71$" and the minimum relative error is "$(1-2^{-8})^{256}-1=-0.63$". Therefore, if the values of a1 and a2 are larger than the other 255 pieces of values, the effect of the relative error upon the accumulated result is increased.

To prevent the above deterioration of precision, heretofore an error of one added result is calculated by a subtracter and the error is accumulated by another adder and added to the added result in technique shown in Japanese Published Unexamined Patent Applications No. H1-169627, No. H4-281524 and others.

However, in the above prior examples, there is a defect that three or four respective other floating-point adders and floating-point subtracters are required and the scale of a circuit is enlarged because of a barrel shifter and others included in the floating-point adder.

Also in the prior examples, the effect that precision is enhanced by increasing the number of bits in data can be obtained as a result, however, as the order of addition is equal to that of accumulation shown in FIG. 11, precision comes into question as in the case shown in FIG. 11 when the frequency of addition is greatly increased.

In the above prior examples, the case is equivalent to a fact that the bit length p of the floating-point part is extended to 2p in a floating-point operation. Therefore, the relative error er is "$|er|\leq 2^{-2p}$". As a result, the maximum relative error of a first input value is "$(1+2^{-2p})^N-1$" and the minimum relative error is "$(1-2^{-2p})^N-1$" by the same analysis as the above one.

As described above, when the value of N is large although the value itself of a relative error er is reduced, the relative error er is so large that it cannot be ignored.

Recently, in the field of computation in chemistry, a method called an ab initio molecular orbital method has been frequently used to calculate the quantum mechanical energy of a molecule. In this field, the quantity of computation is often very enormous. In the concrete, if computation is executed by a method called Hartree-Fock approximation, normally energy is calculated using a matrix called Fock matrix. At this time, to calculate one element of Fock matrix, accumulation one hundred million times is required in the case of a large molecule.

Therefore, although the above prior examples provide sufficient precision in the field of image processing and others, there is a problem that the prior examples cannot provide sufficient precision in a field in which the quantity of computation is enormous such as a molecular orbital method.

SUMMARY OF THE INVENTION

The present invention is made to solve the above problems and the object is to provide a floating-point accumulator which can provide sufficient precision even if the quantity of computation is enormous.

To achieve the above object, the present invention related to a floating-point accumulator for accumulating data represented by a floating-point number is constituted including adding means for adding two input data and outputting the added data as added result data and data added order changing means for inputting data to be accumulated and the added result data from the above adding means, extracting two data used for addition of the same level from the data to be accumulated and the added result data and inputting the extracted two data to the above adding means.

According to the present invention, when the frequency of accumulation is increased, a relative error is reduced, compared with a relative error in the prior example.

BRIEF DESCRIPTION OF THE DRAWINGS

FIG. 3a, 3b shows the order of accumulation by an accumulating circuit in both the prior example and the embodiment of the present invention;

FIG. 4 shows the result of comparing a relative error in accumulation by the accumulating circuit in both the prior example and the embodiment of the present invention;

DESCRIPTION OF THE PREFERRED EMBODIMENT

Figure 1:
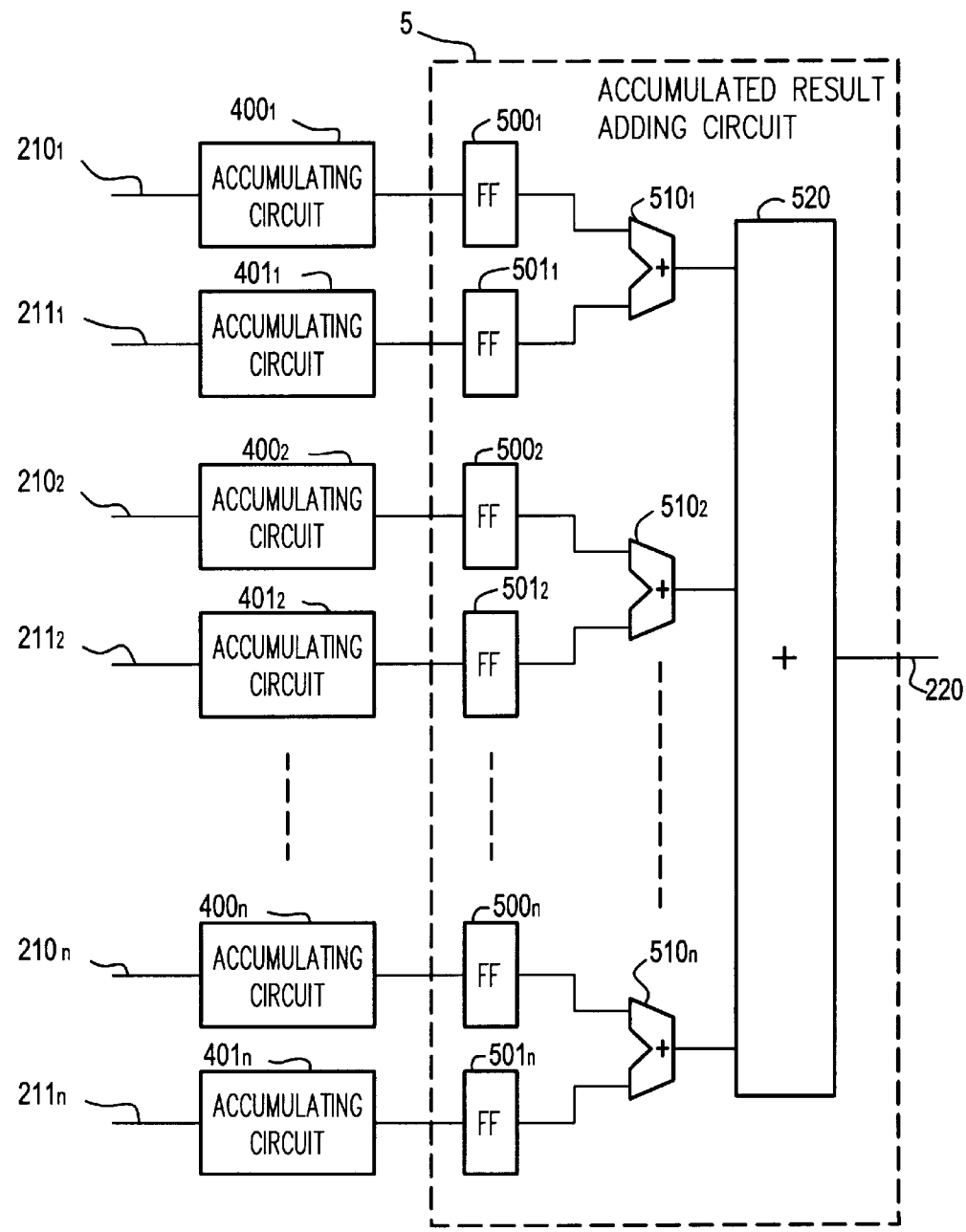
FIG. 1 is a block diagram showing an embodiment of the present invention.

Referring to the drawings, an embodiment of the fifth invention will be described in detail below. In this embodiment, any input data input 2n pieces at a time is accumulated using the accumulator described in relation to the first to the fourth inventions as an accumulating circuit.

As shown in FIG. 1, reference numbers $400_1$, $401_1$, $400_2$, $401_2$, ..., $400n$ and $401n$ respectively denote an accumulating circuit, a reference number 5 denotes an accumulated result adder, reference numbers $500_1$, $501_1$, $500_2$, $501_2$, ..., $500n$ and $501n$ respectively denote a bistable circuit, reference numbers $510_1$, $510_2$, ..., $510n$ respectively denote a floating-point adder, a reference number 520 denotes a floating-point adder for adding n pieces of floating-point numbers, reference numbers $210_1$, $211_1$, $210_2$, $211_2$, ..., $210n$, $211n$ respectively denote an input terminal, and a reference number 220 denotes an output terminal.

Data to be accumulated is simultaneously input one a clock from input means such as a line filter respectively via input terminals $210_1$, $211_1$, $210_2$, $211_2$, ..., $210n$ and $211n$. However, the same number of data are not required to be input from each input terminal, for example, 101 pieces of data may be input from the input terminal $210_1$ and 100 pieces of data may be input from another input terminal and in the above case, $200n+1$ pieces of data are accumulated and output from the output terminal 220.

In the above accumulator, first in the accumulating circuits $400_1$, $401_1$, $400_2$, $401_2$, ..., $400n$ and $401n$, data input from the respective input terminals $210_1$, $211_1$, $210_2$, $211_2$, ... $210n$ and $211n$ are respectively accumulated and $2n$ pieces of accumulated results are output to the accumulated result adding circuit 5.

Figure 5:
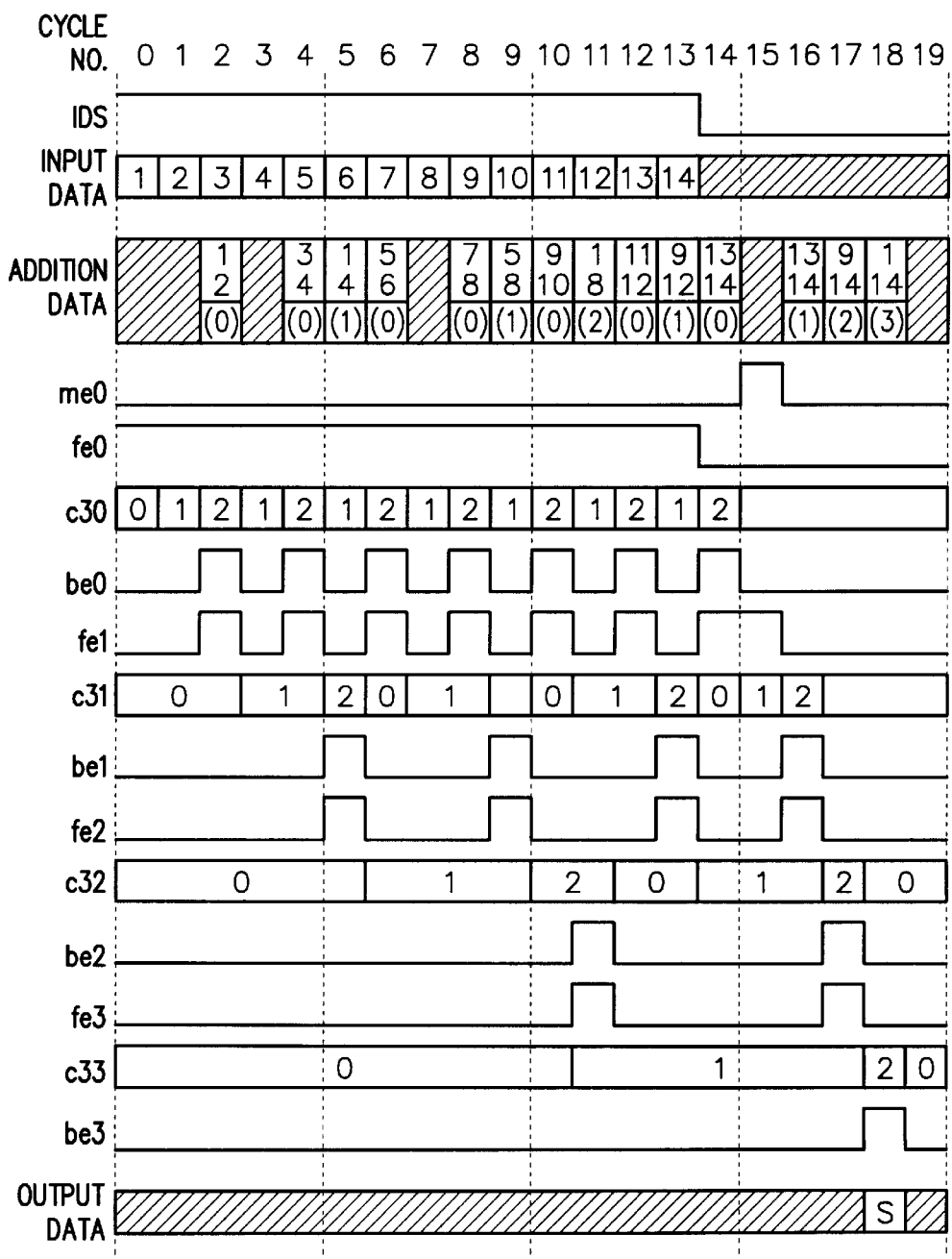
FIG. 5 is a timing chart showing the timing of accumulation by the accumulating circuit equivalent to the embodiment of the present invention.

Next, in the accumulated result adding circuit 5, the respective accumulated circuits s are stored in the bistable circuits $500_1$, $501_1$, $500_2$, $501_2$, ..., $500n$ and $501n$. At this time, as timing for obtaining accumulated results is different depending upon the accumulating circuits if the number of data input to the respective accumulating circuits is different, the bistable circuits $500_1$, $501_1$, $500_2$, $501_2$, ..., $500n$ and $501n$ respectively fetch data at timing in which the respective accumulated results are obtained. For example, as described later, a timing accumulated result shown in FIG. 5 is obtained in the accumulating circuit and the accumulated result is output in a cycle 18. At this time, data can be fetched at timing in which the accumulated result is obtained by using an output control signal be3 shown in FIG. 5 as an enable signal for the bistable circuit.

After the accumulated result is stored in the respective bistable circuits and is obtained in the accumulating circuit to which the most data are input, that is, after the accumulated result is obtained in all the accumulating circuits, two accumulated results are added by the respective floating-point adders $510_1$, $510_2$, ..., $510n$, further n pieces of added results are added by the floating-point adder 520, finally one accumulated result is obtained and output from the output terminal 220.

Next, the accumulating circuit will be described in detail. In the above accumulating circuit, as shown in FIG. 3B, accumulation is executed, changing a procedure for adding input data. FIG. 3B shows a procedure for addition when seven data a1 to a7 are input in order, FIG. 3A shows a procedure for addition in the prior accumulation and FIG. 3B shows a procedure for addition in accumulation in this embodiment. The order of addition is shown by a numeral in a parenthesis.

In the prior accumulation shown in FIG. 3A, addition is executed in an input order as described above, while in accumulation in this embodiment shown in FIG. 3B, input data is first grouped two in a group, two data in a group are added and further, the added results grouped two in a group are added. The above operation is repeated and the final accumulated result is obtained. However, if the total number of input data is not the integral multiple of two, halfway addition may be omitted. In FIG. 3B, a7 is directly added to the added result of a5 and a6.

The level of addition in the adding method shown in FIG. 3B is defined as follows: As shown in FIG. 3B, a case that an added result is not included in input for addition (a case that data to be accumulated are added) such as the addition of a1 and a2 and that of a3 and a4 is called addition of a level 0, a case that the added result of the level 0 is included in a number to be added such as a case that the added result of a3 and a4 is added to the added result of a1 and a2 is called addition of a level 1, a case that the added result of the level 1 is included in a number to be added is called addition of a level 2, and hereinafter, a case that the added result of a level n−1 is included in a number to be added is called addition of a level n. In case the levels of data included in input for addition are different such as the addition of a7 and the added result of a5 and a6 shown in FIG. 3B, the level of the larger number of the above levels is adopted. In this case, as the added result of a5 and a6 of the level 0 is included, the above case is addition of the level 1. That is, the addition of data to be accumulated is the level 0 and if an added result is included in input for addition, the higher level of addition is adopted. Addition of a lower level shall be executed precedently.

Figure 2:
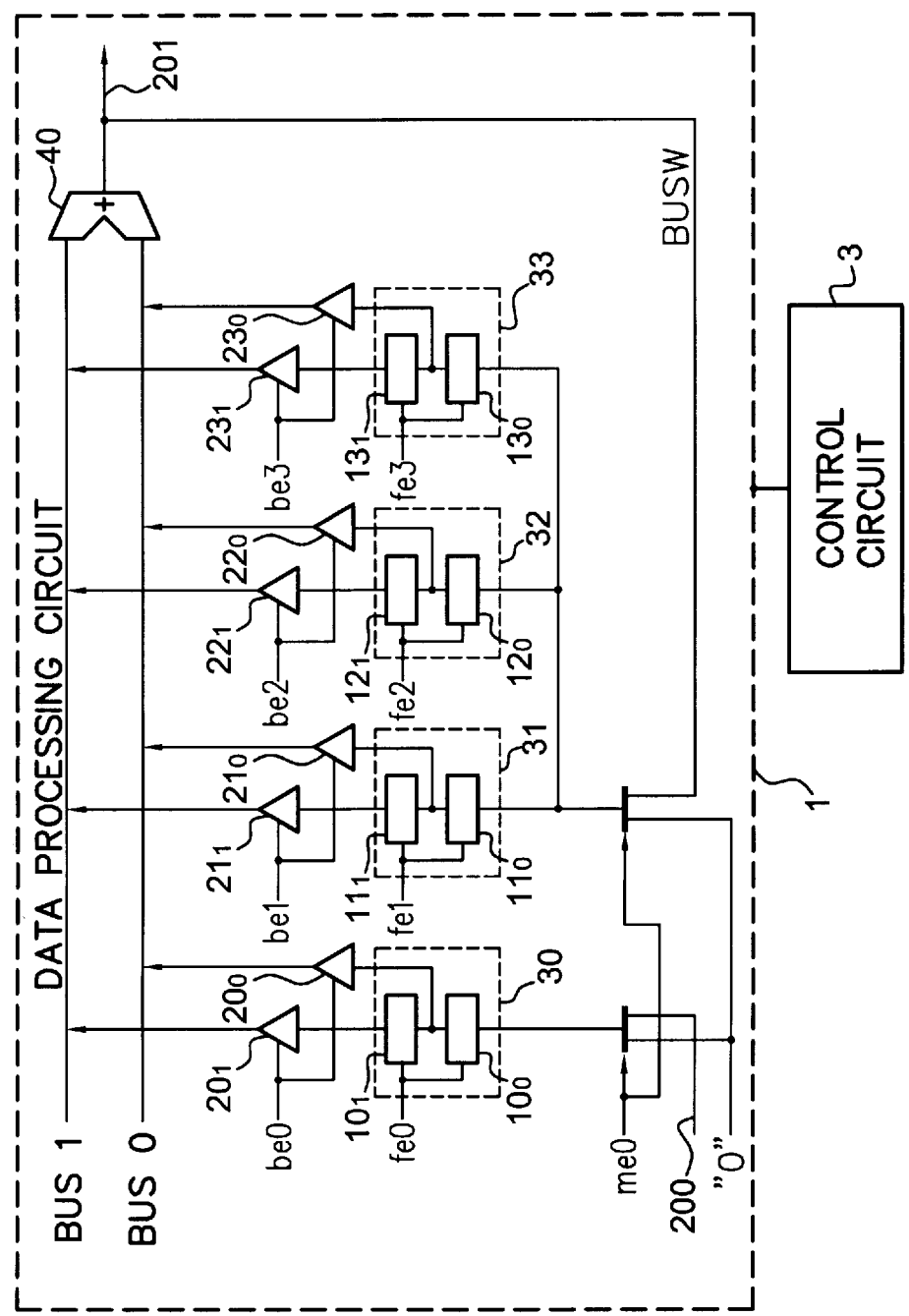
FIG. 2 is a block diagram showing an accumulating circuit equivalent to the embodiment of the present invention.

FIG. 2 shows the detailed circuit diagram of the accumulating circuit. To simplify description, a circuit in case the maximum 16 pieces of floating-point numbers are accumulated will be described below.

As shown in FIG. 2, the accumulating circuit is constituted by a data processing circuit 1 for processing data and a control circuit 3 for controlling the data processing circuit 1. As shown in FIG. 2, reference numbers $10_0$, $10_1$, $11_0$, $11_1$, $12_0$, $12_1$, $13_0$ and $13_1$ respectively denote a bistable circuit for storing a floating-point number, reference numbers $20_0$, $20_1$, $21_0$, $21_1$, $22_0$, $22_1$, $23_0$ and $23_1$ respectively denote a buffer, a reference number 40 denotes an adder as adding means for adding floating-point numbers and reference numbers 41 and 42 respectively denote a multiplexer.

The bistable circuits $10_0$ and $10_1$, $11_0$ and $11_1$, $12_0$ and $12_1$, and $13_0$ and $13_1$ respectively constitute shift registers 30, 31, 32 and 33 each of which is provided with word length equivalent to two words. The operation of these shift registers 30 to 33 is respectively controlled by enable signals fe0, fe1, fe2 and fe3, while the shift registers are enabled, they store floating-point data, shifting bits in synchronization with a clock signal not shown and while they are disabled, they respectively hold the stored value. The shift registers 30 to 33 respectively hold data for executing addition of the level 0, the level 1, the level 2 and the level 3. Therefore, the shift register holding addition data of a level n is also called a shift register for the level n.

Pairs of buffers consisting of the buffers $20_0$ and $20_1$, $21_0$ and $21_1$, $22_0$ and $22_1$, and $23_0$, and $23_1$, are respectively operated according to control signals be0, be1, be2 and be3, while these control signals are enabled, the pair of buffers outputs the output of the respectively connected bistable circuit to BUS0 and BUS1 and while control signals are disabled, the output impedance is increased.

The multiplexers 41 and 42 are switched by a control signal me0 in output.

Enable signals fe0, fe1, fe2 and fe3 for the bistable circuits, control signals be0, be1, be2 and be3 for the buffers, and a control signal me0 for the multiplexers are respectively generated by the control circuit 3. The control circuit will be described later.

A part except an adder 40 of the data processing circuit corresponds to data added order changing means, in detail the multiplexer 42 and a part of the control circuit for generating an enable signal fe0 correspond to an input data extracting section for extracting two data from data to be accumulated, the shift register 30 corresponds to an input data storing section for storing data extracted by the input data extracting section, the multiplexer 41 and a part of a control signal for generating enable signals fe0 to fe3 correspond to an added result extracting section for extracting two data added at the same level from added result data added by the adding means, the shift registers 31 to 33 respectively correspond to plural added result storing sections for storing data extracted by the added result extracting section every level of addition, and the buffers $20_0$ to $23_1$ and a part of the control circuit for generating control signals be0 to be3 correspond to a stored data extracting section for extracting two data used for addition of the same level from the input data storing section and the plural added result storing sections and inputting the two data to the adding means.

Next, the outline of the operation of the accumulating circuit shown in FIG. 2 will be described. First, the basic operation of this circuit will be described. If two floating-point data are stored in any of the shift registers 30 to 33, the two data is respectively output to BUS0 and BUS1 via the buffer connected to the above register of the buffers $20_0$, $20_1$ to $23_0$ and $23_1$.

The output two data are input to the adder 40 via BUS0 and BUS1, added there and output as added result data. The added result data is returned to each input of the shift registers 31 to 33 via BUSW and the multiplexer 41 and written into the shift register corresponding to the higher addition level by one of the shift register holding the floating-point data before addition. The above accumulating circuit accumulates a floating-point number by repeating the above basic operation.

In further detailed description, data is input one word at a time from an input terminal 200 in synchronization with a clock signal and stored in the shift register 30 via the multiplexer 42. When two data are stored in the shift register 30, the above basic operation is executed and added result data is stored in the shift register 31. Afterward, data is also stored in the shift register for the higher level in order by writing input data in the shift register 30 two at a time and the basic operation is automatically repeated. At this time, if two data are simultaneously stored in the two or more shift registers, frequent addition, that is, addition of a lower level is preceded, the basic operation is executed and the shift register storing data of the higher addition level holds the data until the adder 40 is free.

When the input of data to the accumulating circuit is finished, the accumulated result is automatically output from output 201 in case the total number of the data is the integral multiple of two. However, in case the total number of data is not the integral multiple of two, the operation is stopped with the specific shift register holding only one data. Thus, data 'O' represented by a floating-point number is written into a suitable one of the shift registers 30 to 33 via the multiplexers 41 and 42. As the above basic operation is again executed when data is added by writing '0' to the shift register holding only one data when the operation is stopped, the accumulated result is finally output from the output 201.

In this circuit, addition is executed in such an order as shown in FIG. 3B because the shift register for holding floating-point data is changed every addition level. As the addition of the level 0 is executed once in two cycles, the addition of the level 1 or more is suitably allocated to a vacant cycle. As a result, delay time since the last data is input until the accumulated result is output is substantially the same as heretofore.

Next, the operation when addition is executed by the circuit shown in FIG. 2 will be described in detail, showing a case that 14 pieces of data a1 to a14 are input and accumulated as an example.

Enable signals fe0 to fe3 for the shift registers 30 to 33 and control signals be0 to be3 for the buffers $20_0$, $20_1$ to $23_0$ and $23_1$ are respectively activated at a high level in the circuit shown in FIG. 2. Therefore, when any of enable signals fe0 to fe3 is at a high level in a specific clock cycle, the shift register corresponding to an enable signal at a high level fetches data at the end of the cycle. The multiplexer 41 inputs added result data on BUSW to the shift registers 31 to 33 when a control signal me0 is at a low level and inputs a floating-point number '0' to the shift registers 31 to 33 when a control signal me0 is at a high level. Further, the multiplexer 42 inputs input data from the input terminal 200 to the shift register 30 when a control signal me0 is at a low level and inputs the floating-point number '0' to the shift register 30 when a control signal me0 is at a high level. The adder 40 outputs added result data represented by a floating-point number to BUSW after fixed delay time shorter than one clock cycle when two floating-point numbers are input from BUS0 and BUS1.

FIG. 5 shows an operation when 14 pieces of data are added. FIG. 5 shows the change according to time of respective data and signals. Numerals 0, 1, 2, - - - in the uppermost field denote the cycle number of each clock, IDS denotes an input data strobe signal which is turned at a high level while data is input so as to show that data is input, input data denotes data input from the input terminal 200 and added data denotes data added by the adder 40. An input data strobe signal IDS is not input to the accumulating circuit shown in FIG. 2 and used in the control circuit described later. In the field of the input data, only subscripts of the data a1 to a14 are shown. Two numerals described in the field of the added data show the range of added data and for example, if 1 and 4 are shown, accumulation in the range of a1 to a4 is executed. Further, a numeral shown in a parenthesis under added data shows the level of addition.

"c30, c31, c32 and c33" denote the number of data respectively held in the shift registers 30 to 33 and as the shift register can store maximum two data, any of 0 to 2 is entered in the field of c30 to c33. Output data shown in the lowest field denotes added result data output from the output 201.

Figure 6:
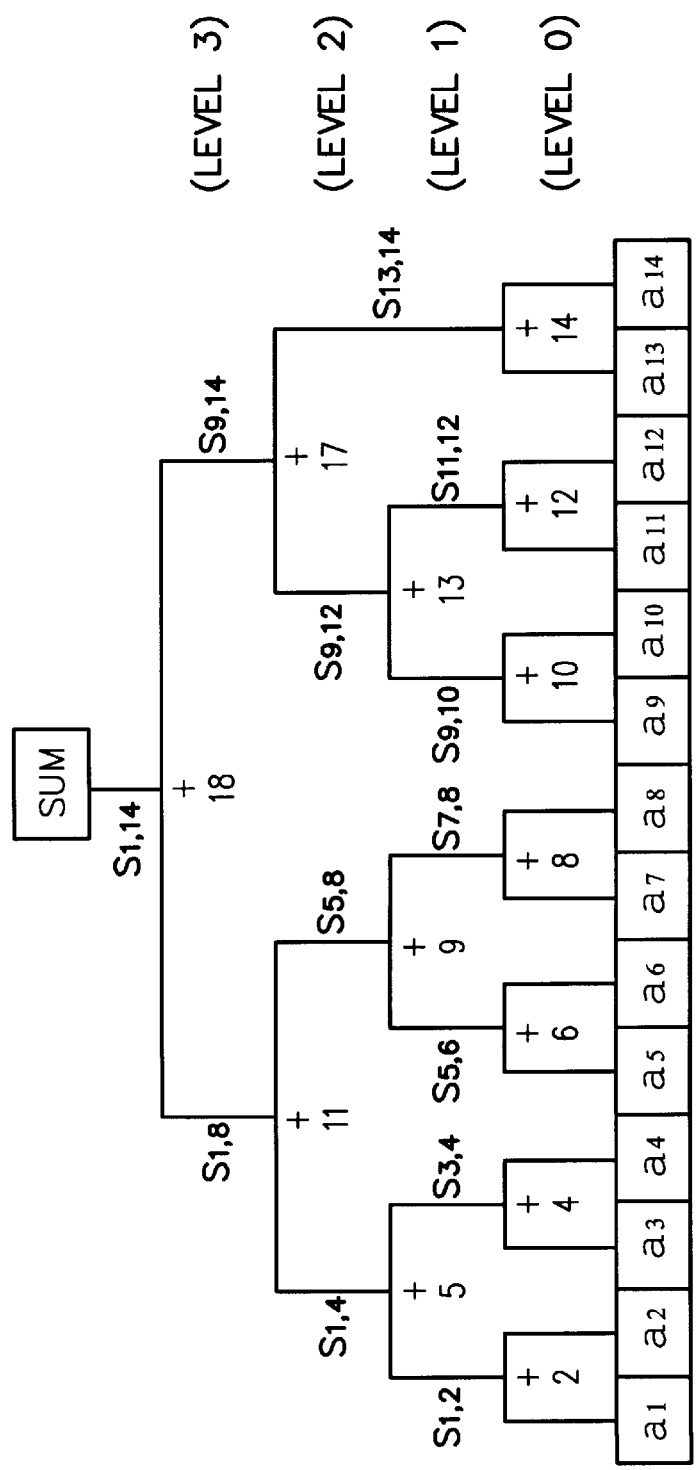
FIG. 6 shows the order of accumulation when 14 pieces of data are added by the accumulating circuit equivalent to the embodiment of the present invention.

FIG. 6 shows the order of addition when data a1 to a14 are accumulated. A numeral shown under each plus corresponds to the cycle number of a clock shown in FIG. 5 and shows in which clock cycle each addition is executed. When accumulated results ai and aj are obtained halfway, these intermediate results are shown as si, j in FIG. 6. The intermediate results correspond to added data in which i and j are described shown in FIG. 5 and mean that the above values are obtained in the clock cycle.

Referring to FIGS. 5 and 6, the operation of the accumulating circuit shown in FIG. 2 when the data a1 to a14 are accumulated will be described below. First, input data is input one in a cycle from the input terminal 200. During an input term of cycles 0 to 13, a control signal me0 is held at a low level. Therefore, input data from the input terminal 200 is supplied to the shift register 30 via the multiplexer 42 and a signal on BUSW is supplied to the shift registers 31 to 33 via the multiplexer 41. As an enable signal fe0 is held at a high level during the input term, input data is stored in the shift registers in order.

At this time, as two input data of a1 and a2 the addition of the level 0 of which is first to be executed in a cycle 2 are stored in the shift register 30, the above basic operation is executed. That is, a control signal be0 is turned at a high level in the cycle 2 and floating-point numbers a2 and a1 held in the bistable circuits $10_0$ and $10_1$ inside the shift register 30 are output to BUS0 and BUS1 via the buffers $20_0$ and $20_1$. Further, these data are added by the adder 40 and the added result data is output to BUSW during the cycle 2. At the same time that a control signal be0 is turned at a high level, an enable signal fe1 for the shift register 31 for the higher addition level by one is also turned at a high level. Hereby, added result data s1, 2 output to BUSW is written into the shift register 31 and in the next cycle 3, the added result data s1, 2 is held in the shift register 31. In the cycle 2, two data are read from the shift register 30 and at the end of the cycle 2, the floating-point number a3 is written into the shift register 30. As a result, the number of meaningful data held in the shift register 31 is 1 in the cycle 3.

As afterward similarly the addition of the level 0 is also executed according to the basic operation in a cycle 4, the floating-point numbers a3 and a4 are added and the added result data s3, 4 is stored in the shift register 31. As a result, in a cycle 5, the two added result data s1, 2 and s3, 4 are held in the shift register 31. In the cycle 5, the basic operation is executed and the addition of the level 1 is executed for these data. At this time, first a control signal be1 is turned at a high level, the added result data s1, 2 and s3, 4 stored in the shift register 31 are output to BUS0 and BUS1 via the buffers $21_0$ and $21_1$ as in the addition of the level 0 and added by the adder 40, and added result data s1, 4 is output to BUSW. As at the same time, an enable signal fe2 for the shift register 32 of the higher level by one is turned at a high level, the added result s1, 4 is stored in the shift register 32 in the cycle 5 and held in a cycle 6. As two data held in the shift register 31 are read by this addition, the number of meaningful data held by the shift register 31 in the cycle 6 is zero.

Afterward, similarly the basic operation is repeated and as added result data s5, 8 obtained in a cycle 9 is stored in the shift register 32 in a cycle 10, the two added result data s1, 4 and s5, 8 are held in the shift register 32 in the cycle 10. In the meantime, as data is simultaneously input, the two data of the floating-point numbers a9 and a10 are also held in the shift register 30 in the same cycle 10. However, as only one adder 40 is provided, two additions cannot be simultaneously executed in the same cycle. Thus, only either addition is executed. As addition of the lower level is preceded as described above in such a case, a control signal be0 is turned at a high level with a control signal be2 held at a low level and the floating-point numbers a9 and a10 are added. Afterward, as the adder 40 is enabled in a cycle 11, the basic operation is executed for the data held in the shift register 32. At this time, a control signal be2 is turned at a high level, the added result data s1, 4 and s5, 8 are added by the adder 40, an enable signal fe3 for the shift register 33 of the higher level by one is turned at a high level, the added result data s1, 8 is written into the shift register 33 and in the next cycle 12, the number of meaningful data held in the shift register 32 is zero.

As described above, a signal on BUSW is supplied to the shift registers 31 to 33 via the multiplexer 41. Therefore, when enable signals fe1 to fe3 are simultaneously turned at a high level, the same data is written into plural shift registers. However, as described above, the order of priority is given over control signals be0 to be2 and only one control signal is always turned at a high level. Further, as enable signals fe1 to fe3 are used only when the added result is written into the shift registers 31 to 33 while a control signal me0 is at a low level, enable signals are necessarily turned at a high level at the same time as control signals be0 to be2. Therefore, it need scarcely be said that enable signals fe1 to fe3 are never turned at a high level simultaneously.

The above operation is repeated, when the input of 14 pieces of data is finished, the last input data a14 is written into the shift register 30 in a cycle 13 and the added result data s13, 14 of the floating-point numbers a13 and a14 is written into the shift register 31 according to the basic operation in a cycle 14. As a result, no data is stored in the shift register 30 in a cycle 15 and added result data s13, 14, s8, 12 and s1, 8 are stored one in each of the shift registers 31, 32 and 33. As the basic operation is not executed if no shift register holds two data after the input of data is finished, addition after this is not continued and the operation of the circuit is stopped.

In the cycle 15, a control signal me0 for the multiplexer is switched, the data '0' of a floating-point number is added to the shift register and addition is continued. As a control signal me0 is turned at a high level only during the cycle 15 and the multiplexers 41 and 42 are switched, floating-point data '0' is supplied to the shift registers 30 to 33. Further, one of enable signals fe0 to fe3 for the respective shift registers is turned at a high level and data '0' is written into one of the shift registers.

At this time, the shift register for the lowest level into which the data '0' is to be written is selected of the shift registers holding only one data. As in this case the shift register 31 corresponding to the level 1 is the shift register for the lowest level, an enable signal fe1 is turned at a high level in the cycle 15 and the data '0' is written into this shift register 31. Therefore, the shift register 31 holds two data in a cycle 16.

In the meantime, a control signal me0 is again turned at a low level in the cycle 16 and a signal on BUSW is again supplied to the shift registers 31 and 33 by the multiplexer 41. Therefore, in the cycle 16 or later, the basic operation is again started for the two data held by the shift register 31 and the following addition is continued. First, a signal be1 is turned at a high level, the data s13, 14 is output to BUS1, the data '0' is output to BUS0 and the above added result data s13, 14 is output to BUSW. Simultaneously, an enable signal fe2 is turned at a high level and the data s13, 14 is written into the shift register 32. Next, in a cycle 17, the basic operation is executed for data s9, 12 and s13, 14 held by the shift register 32 and data s9, 14 which is the added result is written into the shift register 33. Further, in a cycle 18, the basic operation is executed for two data s1, 8 and s9, 14 held by the shift register 33 and finally, the accumulated result s1, 14 is obtained. The accumulated result s1, 14 is output from the output terminal 201 in the cycle 18 and if a control signal be3 is used for an output strobe signal because the control signal be3 is turned at a high level in the same cycle, the accumulated result can be latched in an external circuit.

As described above, as the data '0' of a floating-point number is added to the shift register in the cycle 15 or later, the final accumulated result can be obtained. As this accumulating circuit is operated so that the data '0' is written into the shift register for the lowest level of the shift registers holding only one data in a state in which no shift register holds two data after the input of data is finished, the accumulating circuit is normally operated even if the number of data is arbitrary below 14.

For example, if the number of data is 12, the operation is stopped with one data stored in each of the shift registers 32 and 33 as clear from the above description. In this case, as the data '0' is automatically written into the shift register 32 of the lowest level, afterward the addition of the levels 2 and 3 is executed in order according to the basic operation, the accumulated result is obtained and output from the output 201.

If the number of data is 13, the operation is stopped with one data stored in each of the shift registers 30, 32 and 33.

In this case, first the data '0' is automatically written into the shift register 30 of the lowest level and the result of the addition of the level 0 is written into the shift register 31. As a result, the operation is again stopped with only one data stored in each of the shift registers 31 to 33. Afterward, as the data '0' is again stored in the shift register 31 of the lowest level, the accumulated result is obtained as in case the number of data is 14 and output from output 301.

As the operation is stopped with one data stored in each of all the shift registers 30 to 33 if the number of data is 15, the data '0' is stored in the shift register 30 of the lowest level, the addition of the levels 0 to 3 is executed in order and the accumulated result is obtained.

Further, as 16 is the integral multiple of two if the number of data is 16, addition up to the level 3 is automatically executed after input is finished and the accumulated result is output without writing the data '0'.

A case that the data '0' is input to the shift registers 31 to 33 by switching the multiplexer 41 is described above, however, the data '0' may be also input to the shift registers 31 to 33 by inputting the data '0' two at a time via the multiplexer 42.

As described above, the accumulating operation is executed, however, as the addition of the lower level is preceded when two or more shift registers store two data as in the cycle 10, the addition of data stored in the shift register corresponding to the addition of the higher level is made to wait for one cycle or more. If the number of input data is different from that in this example, a malfunction occurs when the next data is written into the shift register corresponding to a high level during the above waiting time. However, as in fact addition is necessarily executed before writing, such a malfunction does not occur.

Figure 7:
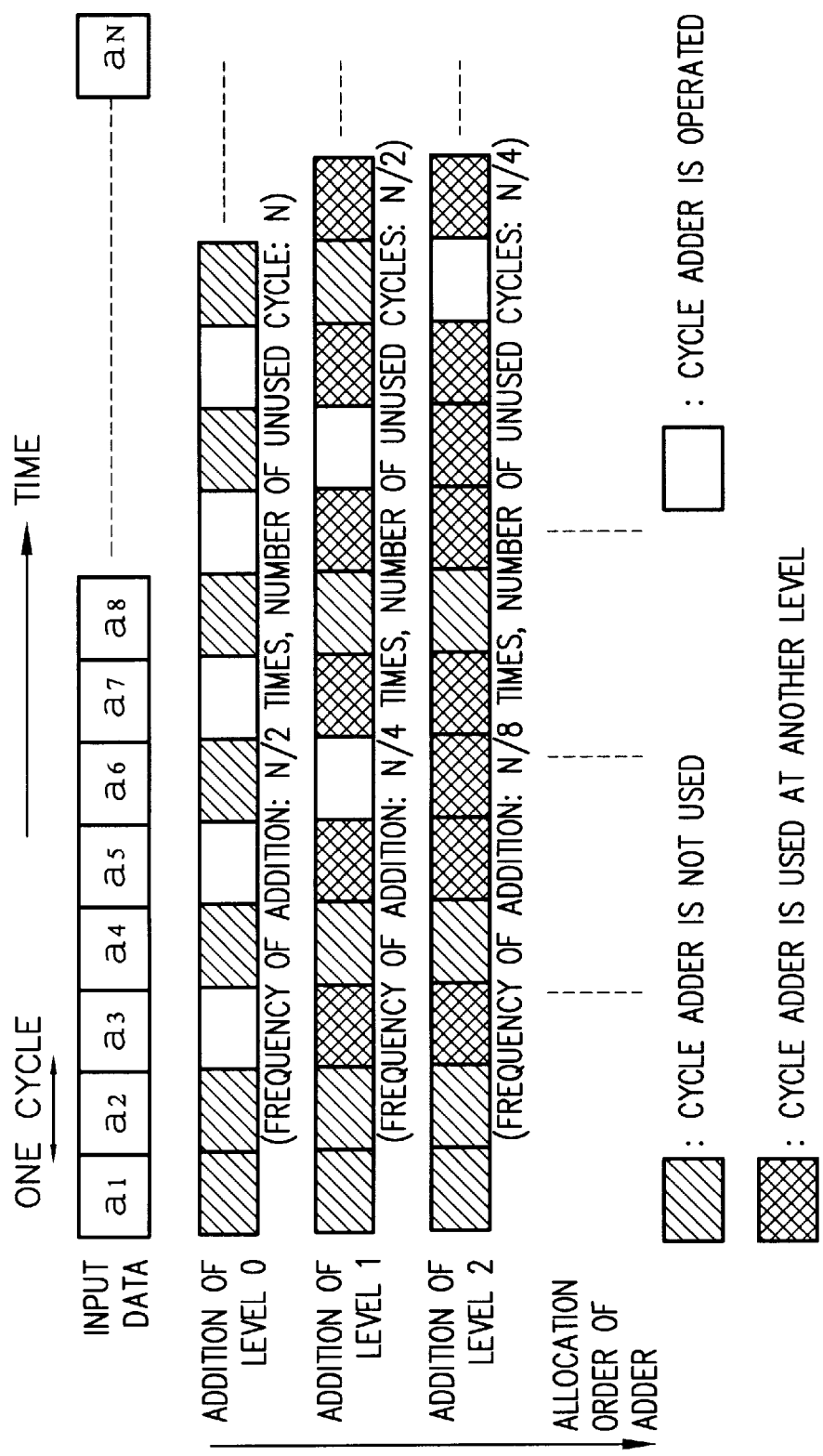
FIG. 7 shows a state in which an adder is used in case accumulation is executed by the accumulating circuit equivalent to the embodiment of the present invention.

Referring to FIG. 7, the above will be briefly described below. FIG. 7 shows an example that the number of input data is N and a state in which an adder is allocated in order from top to bottom, that is, from the addition of the lower level to the addition of the higher level. As shown in FIG. 7, when an adder is allocated to the addition of a level, a hatched part shows timing in which the adder is free without being allocated to the addition of the level. Therefore, the adder is allocated to the addition of the higher level located immediately under the above level in FIG. 7 from the above vacant timing.

First, as the addition of a level 0 is executed for two input data once per each group, it is not executed in one of two cycles. Therefore, the above N/2 cycles are used for allocation to the addition of a level 1. At this time, there is necessarily a vacant cycle between the even addition and the odd addition of the level 0 and as this cycle is allocated to the addition of the level 1, the addition of the level 1 can be completed since two data are stored in the shift register for the level 1 till the next writing. As only N/4 cycles are used for the addition of the level 1 of vacant cycles equivalent to the above N/2 cycles, the residual N/4 cycles can be allocated to the addition of a level 2. As at this time, there are also necessarily vacant cycles between the even addition and the odd addition of the level 1 as clear from FIG. 7, these cycles are allocated to the addition of the level 2. As a result, the addition of the level 2 can be completed since two data are stored in the shift register for the level 2 till the next writing. As the frequency of the addition of the level 2 is N/8 cycles, the residual N/8 cycles are allocated to the addition of the higher level by one. As an adder is similarly allocated to the addition of a further higher level, the above malfunction does not occur.

In the meantime, if N is large, the added result can be also output in substantially the same time as heretofore since the input of data is finished by increasing shift registers for the addition of the higher level. That is, as the frequency of the addition of the level 0 is N/2 times as described above and only N/2 cycles are used of N cycles in which data is input, the residual N/2 cycles can be used for the addition of the level 1 or the higher level. As the frequency of the addition of the level 1 is N/4 times and only N/4 cycles are used of N/2 cycles, the residual N/4 cycles can be used for the addition of the level 2 or the higher level. As described above, as the frequency of addition is halved as a level is higher, the addition of all levels can be finished in N cycles.

Next, the control circuit for controlling the data processing circuit in the accumulating circuit shown in FIG. 2 will be described. In the control circuit, each signal for control used in the accumulating circuit shown in FIG. 2 is generated.

Figure 8:
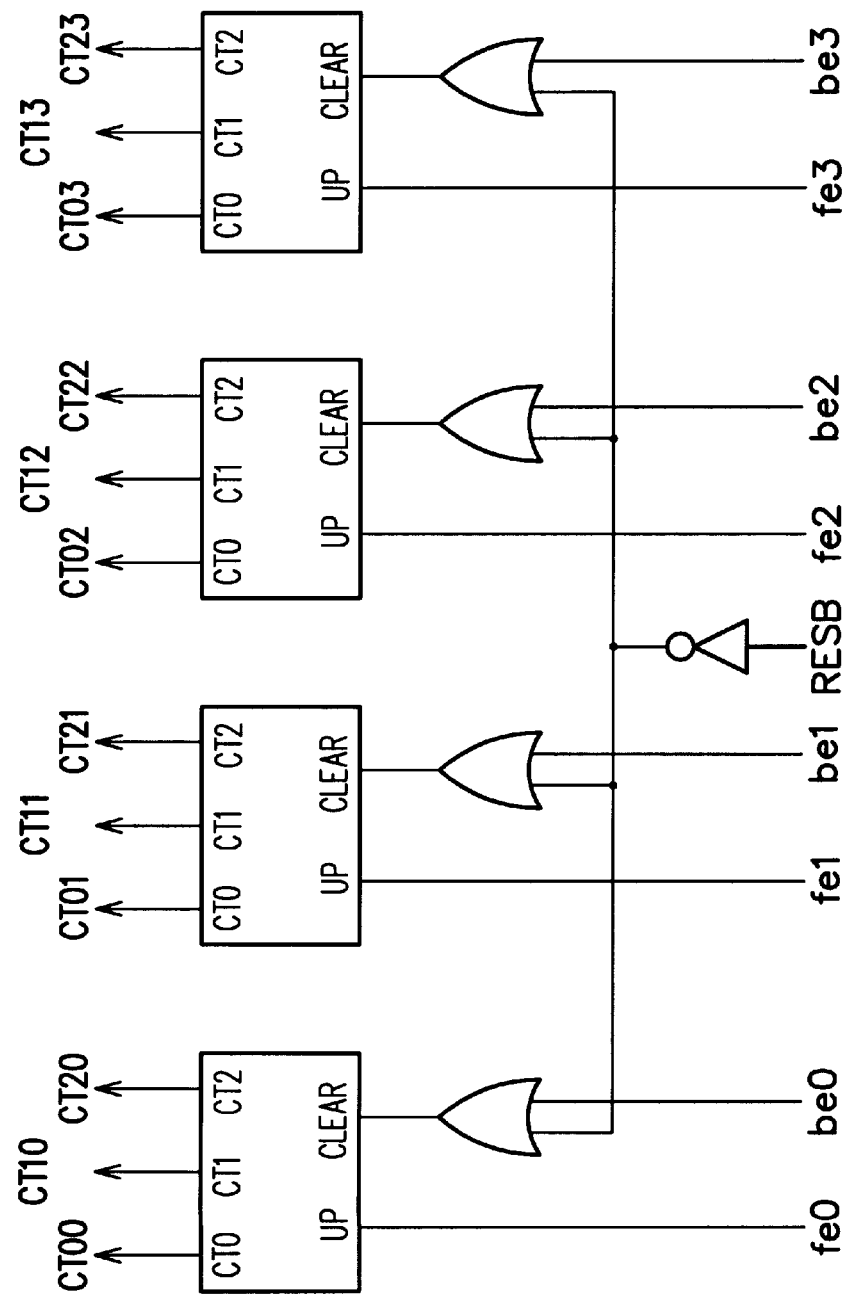
FIG. 8 shows a circuit of a part including a counter circuit in a control circuit of the accumulating circuit equivalent to the embodiment of the present invention.

As described above, the operation of this accumulating circuit is controlled by the number of data held by the respective shift registers. Therefore, a counter for counting the number of data is provided every shift register. FIG. 8 is a circuit diagram showing a part including the above counter circuit of the control circuit. As shown in FIG. 8, reference numbers 300, 301, 302 and 303 respectively denote a counter for counting data respectively held by the shift registers 30 to 33. Therefore, enumerated data by these counters respectively corresponds to c30, c31, c32 and c33 shown in FIG. 5. Reference numbers 310, 311, 312 and 313 respectively denote OR gate for generating CLEAR signal input to each counter and a reference number 320 denotes an inverter.

First, the operation of the counters 300 to 303 will be described. These counters are operated in synchronization with a clock signal as in the circuit shown in FIG. 2. In FIG. 8, a clock signal is not shown. These counters count values in the range of 0 to 2 and when enumerated data is 0, 1 and 2, a signal at a high level is output from only one of terminals CT0, CT1 and CT2 and the residual terminals are at a low level. UP terminal and CLEAR terminal are provided in each of these counters and two signals of UP for increment and CLEAR for synchronous clearing are respectively input.

When only UP input terminal is at a high level in a certain cycle, enumerated data held in the counter is incremented at the end of the cycle and a value after increment is held in the next cycle. Therefore, when the UP input terminal is turned at a high level in a cycle in which for example, CT0 is held at a high level, CT1 is turned at a high level in the next cycle and when the UP input terminal is turned at a high level in a cycle in which CT1 is held at a high level, CT2 is turned at a high level in the next cycle. A case that only the UP input terminal is at a high level when CT2 is at a high level is not considered in relation to this circuit because such a case is impossible. Next, when only CLEAR input terminal is at a high level, enumerated data is cleared to zero at the end of the cycle independent of a held value. Therefore, CT0 is held at a high level in the next cycle. When both the CLEAR input terminal and the UP input terminal are at a high level in a certain cycle, enumerated data is turned to one at the end of the cycle independent of a held value. Therefore, CT1 is held at a high level in the next cycle. When both the CLEAR input terminal and the UP input terminal are at a low level, a value held in the cycle is also held in the next cycle. The above counter circuit is constituted by adding a decoder to the output of a normal counter for outputting a binary count value and can be readily realized by combining bis table circuits and logic gates.

RESB signal shown in FIG. 8 is a reset pulse activated at a low level. After the above reset pulse is inverted by the inverter 320, it is input to each CLEAR input terminal of the counters 300 to 303 via OR gates 310 to 313. Before data input is started, a reset period for turning RESB input terminal at a low level for one cycle or longer in a state in which an input data strobe signal IDS is turned at a low level is provided. At this time, as the UP input terminals of all the counters are turned at a low level and the CLEAR input terminals of all the counters are turned at a high level by a circuit described later, a count value is cleared to zero and all the CT0 output terminals are turned at a high level. Afterward, data input is started with the RESB input terminal held at a high level.

Counting the number of data held by each shift register by the above counter as shown in c30 to c33 in FIG. 5 will be described below. Enable signals fe0 to fe3 for each shift register are input to each UP terminal of the counters 300 to 303. Control signals be0 to be3 for controlling the buffers to execute addition are input to each CLEAR terminal of the counters 300 to 303 via the OR gates 310 to 313. As RESB input terminal is held at a high level during accumulation as described above, the inverted signal of RESB which is another input of the OR gates 310 to 313 is turned at a low level and control signals be0 to be3 are directly input to each CLEAR terminal.

As an enable signal any of fe0 to fe3 related to the shift register are turned at a high level and a control signal any of be0 to be3 is turned at a low level when data is only written into the shift register, only the UP input terminal of the counter is turned at a high level, the counter is incremented by one and a value stored in the shift register is counted. Next, when only reading from the shift register and addition are executed, two data are stored in the shift register as described above and as a result of reading, it proves that the number of data is zero. At this time, as enable signals fe0 to fe3 are turned at a low level, control signals be0 to be3 are turned at a high low level and the CLEAR input terminal of the counter is turned at a high level, the enumerated data of the counter is zero. When writing into the shift register, reading from the shift register and addition are simultaneously executed as the operation of the shift register 30 in a step 2 shown in FIG. 5, the number of this added result data is one. At this time, as both enable signals fe0 to fe3 and control signals be0 to be3 are turned at a high level and therefore, both the UP input terminal and the CLEAR input terminal of the counter are turned at a high level, the enumerated data of the counter is one. Further, as both enable signals and control signals are turned at a low level and therefore, the UP input terminal and the CLEAR input terminal of the counter are also at a low level if writing into the shift register and reading from it are not executed, the counter holds the same value.

Therefore, the number of data held by each of the shift registers 30 to 33 is correctly counted by the circuit shown in FIG. 8.

Figure 9:
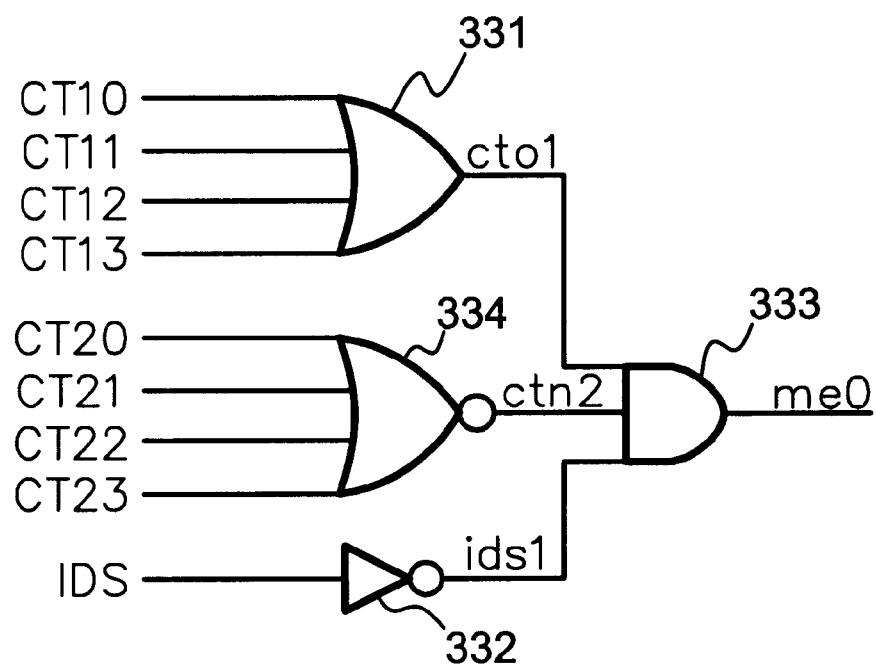
FIG. 9 shows a circuit of a part for generating a control signal me0 in the control circuit of the accumulating circuit equivalent to the embodiment of the present invention.

Next, FIG. 9 shows a circuit for generating a control signal me0 input to the multiplexers 41 and 42. As shown in FIG. 9, a reference number 331 denotes an OR gate for four inputs, 332 denotes an inverter, 333 denotes an AND gate for three inputs and 334 denotes a NOR gate for four inputs.

The operation of this circuit in accumulation will be described in order below.

As in a first reset period, the enumerated data of each counter 300 to 303 is zero as described above and a signal CT10 to CT13 from each counter is turned at a low level, the output cto1 of the OR gate is turned at a low level. As a result, the output of the AND gate 333 is turned at a low level.

Next, as an input data strobe signal IDS is turned at a high level and the output idsi of the inverter 332 is turned at a low level when the input of data is started, the output of the AND gate 333 is held at a low level.

Further, if the shift register holding two data is left after data input is finished, further addition is executed. As in this period, the output of CT2 is turned at a high level in one of the counters 300 to 303 and the output ctn2 of the NOR gate is turned at a low level, the output of the AND gate 333 is held at a low level. Therefore, in the above period, a control signal me0 is held at a low level. This period is equivalent to the cycles 0 to 14 shown in FIG. 5.

Afterward, no shift register holds two data and an adding operation is stopped as described above. As in this case the output of CT2 of each counter 300 to 303 is at a low level, the output ctn2 of the NOR gate is turned at a high level. As at least one shift register holding only one data exists if an adding operation is required to be continued, the output cto1 of the OR gate is also turned at a high level. Further, as an input data strobe signal IDS is at a low level after data input is finished, the output idsi of the inverter is at a high level. As a result, a control signal me0 which is the output of the AND gate 333 is turned at a high level. Hereby, the multiplexers 41 and 42 are switched as described above, data '0' is input to all the shift registers and the data is written into the suitable shift register. In FIG. 5, this period is equivalent to the cycle 15.

In the next cycle, the shift register into which the data '0' is written at this time holds two data. Therefore, any of CT20 to CT23 is turned at a high level and the output ctn2 of the NOR gate is again turned at a low level. As a result, a signal me0 which is the output of the AND gate 333 is turned at a low level. In FIG. 5, this period is equivalent to the cycle 16.

Afterward, addition is executed as when data is input. As one of the shift registers holds two data while addition is continued, the output ctn2 of the NOR gate is turned at a low level and a control signal me0 is also held at a low level. As a control signal me0 is tuned at a high level in only one cycle according to the above principle and the data '0' is written when afterward no shift register holds two data and any of the shift registers holds only one data even when addition is again interrupted, addition is repeated and the accumulated result is output from the output terminal 201 until a state in which no data is held in all the shift registers is achieved.

Therefore, a control signal me0 is correctly generated by the circuit shown in FIG. 9.

Figure 10:
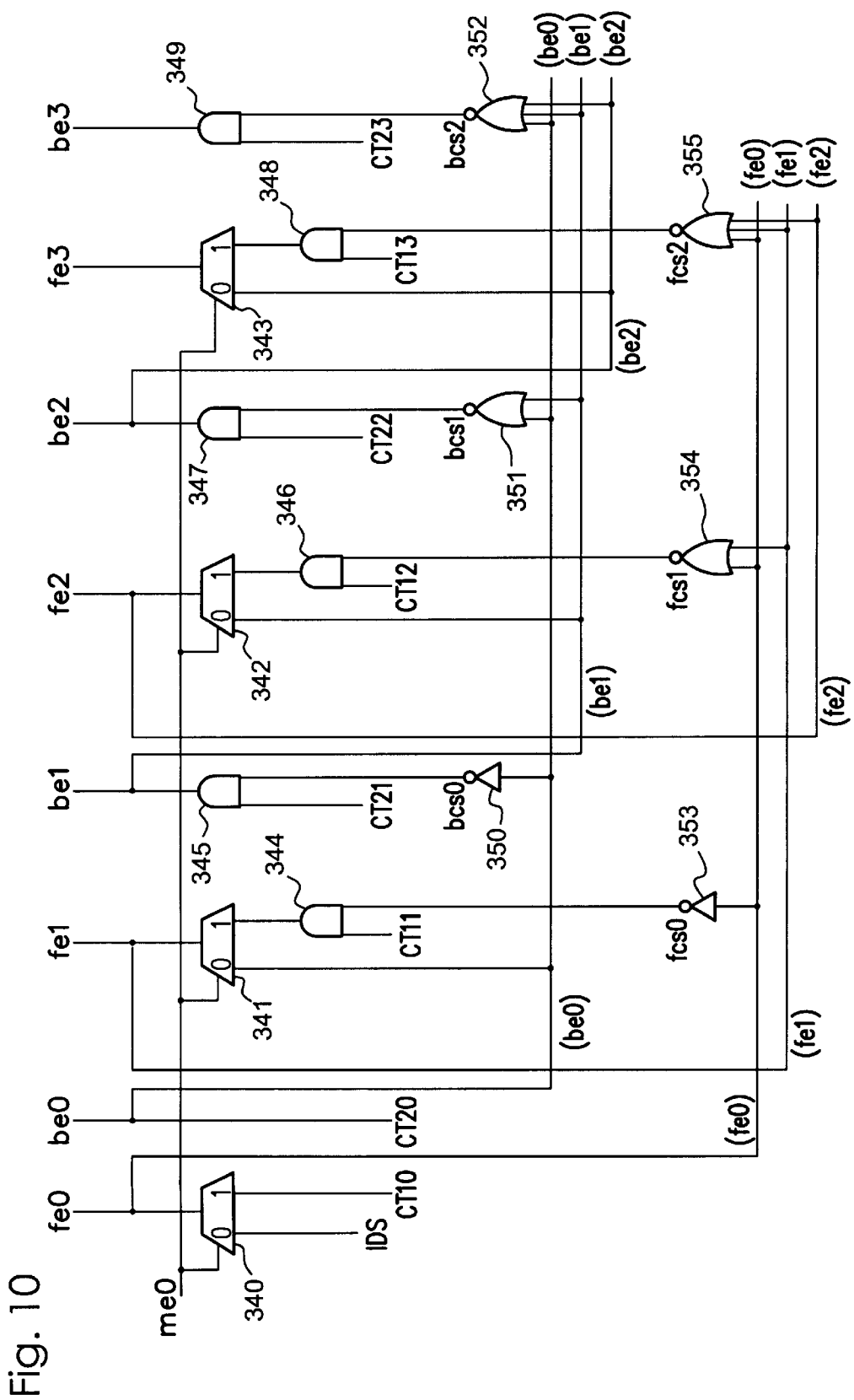
FIG. 10 shows a circuit of a part for generating enable signals fe0 to fe3 and control signals be0 to be3 in the control circuit of the accumulating circuit equivalent to the embodiment of the present invention.

FIG. 10 is a circuit diagram showing a control circuit for generating enable signals fe0 to fe3 and control signals be0 to be3. As shown in FIG. 10, reference numbers 340, 341, 342 and 343 denote a multiplexer for generating enable signals fe0 to fe3, reference numbers 344 to 349 denote an AND gate, reference numbers 350 and 353 denote an inverter and reference numbers 351, 352, 354 and 355 denote a NOR gate.

A control signal be0 is input to the inverter 350, control signals be0 and be1 are input to the NOR gate 351, control signals be0 to be2 are input to the NOR gate 352 and as a result, intermediate signals bcs0, bcs1 and bcs2 are generated. An intermediate signal bcs0 is obtained by inputting a control signal be0 to the inverter 350 and as an intermediate signal be0 is turned at a high level when a control signal be0 is at a low level, the intermediate signal is turned at a low level when the addition of the level 0 is executed. An intermediate signal bcs1 is obtained by inputting control signals be0 and be1 to the NOR gate 351 and as the intermediate signal is turned at a high level only when the control signals be0 and be1 are both at a low level, it is at a low level when the addition of the level 1 or the lower level is executed. Further, an intermediate signal bcs2 is obtained by inputting control signals be0, be1 and be2 to the NOR gate 352 and as the intermediate signal is turned at a high level only when the control signals be0, be1 and be2 are all at a low level, it is at a low level when the addition of the level 2 or the lower level is executed.

Further, an enable signal fe0 is input to the inverter 353, enable signals fe0 and fe1 are input to the NOR gate 354, enable signals fe0 to fe2 are input to the NOR gate 355 and as a result, intermediate signals fcs0, fcs1 and fcs2 are generated. The intermediate signal fcs0 is obtained by inputting an enable signal fe0 to the inverter 353 and as the intermediate signal fcs0 is turned at a high level when an enable signal fe0 is at a low level, it is at a low level when data is written into the shift register 30 corresponding to the addition of the level 0. The intermediate signal fcs1 is obtained by inputting enable signals fe0 and fe1 to the NOR gate 354 and as the intermediate signal is turned at a high level only when enable signals fe0 and fe1 are both at a low level, it is at a low level when data is written into either of the shift registers 30 and 31 corresponding to the addition of the level 1 or the lower level. Further, the intermediate signal fcs2 is obtained by inputting enable signals fe0 to fe2 to the NOR gate 355 and as the intermediate signal is turned at a high level only when enable signals fe0 to fe2 are all at a low level, it is at a low level when data is written into any of the shift registers 30 to 32 corresponding to the addition of the level 2 or the lower level.

First, the operation of a circuit for generating control signals be0 to be3 shown in FIG. 10 will be described.

When two data are held in the shift register 30 corresponding to the level 0, first these data are read and addition is started. At this time, even if the shift register except the shift register 30 holds two data, reading from the shift register 30 and addition are necessarily preceded because the addition of the lower level is preceded as described above. Therefore, for a control signal be0, a signal CT20 from the counter 300 is output as it is. As the above signal CT20 shows the shift register 30 holds two data, the signal is turned at high level if two data are held in the shift register 30, it is at a low level except the above case and can be used for a control signal be0 as it is.

Control signals be1 to be3 are also turned at a high level when two data are held in the shift registers 31 to 33, however, as the addition of the lower level is preceded as described above when two data are also held in the shift register for the lower level in the same cycle, control signals be1 and be3 are required to be at a low level. Therefore, the outputs CT21 to CT23 of the respective counters 301 to 303 and intermediate signals bcs0 to bcs2 are respectively input to AND gates 345, 347 and 349 and the respective outputs of these AND gates are control signals be1 to be3. As described above, intermediate signals bcs0 to bcs2 are at a low level when the addition of the level 0, the level 1 or the lower level and the level 2 or the lower level is respectively executed and turned at a high level except the above case. Therefore, the addition of the respective levels 1 to 3 can be delayed by inputting these signals to the AND gates 345, 347 and 349.

That is, when the addition of the lower level than a level for one of the shift registers 31 to 33 is not executed, intermediate signals bcs0 to bcs2 are at a high level. Therefore, for control signals be1 to be3, a signal from CT2 of the corresponding counter is output as it is. As a result, when two data are held in the shift register, a control signal is turned at a high level and addition is started, and as a control signal is turned at a low level and addition is not executed when two data are not held in the shift register, the above operation is executed.

Next, as intermediate signals bcs0 to bcs2 are turned at a low level when the addition of the lower level than a level for the shift register is executed, a control signal is held at a low level even if two data are held in the shift register. As no new data is written into the shift register as described in relation to FIG. 7 in this cycle, UP and CLEAR input terminals of the corresponding counter are both at a low level and a signal from CT2 is held in a state at that time. Afterward, as an intermediate signal is again turned at a high level when the addition of a low level is finished, the signal from CT2 is output as each control signal be1 to be3 and an adding operation is executed according to the state of a shift register.

Next, the operation of a circuit for generating enable signals fe0 to fe3 shown in FIG. 10 will be described. These enable signals are output from multiplexers 340 to 343. These multiplexers are controlled by a control signal me0, when the control signal me0 is at a low level, inputs on the left side of FIG. 10 are respectively output as enable signals fe0 and fe1 and when the control signal me0 is at a high level, inputs on the right side of FIG. 10 are respectively output as enable signals fe2 and fe3. Therefore, both cases of when a control signal me0 is at a high level and when it is at a low level will be described below.

First, when a control signal me0 is at a low level, data input from the input terminal 200 is stored in the shift register 30 and the added results of the levels 0 to 2 are respectively stored in the shift registers 31 to 33 as described above. Therefore, for an enable signal fe0, an input data strobe signal IDS has only to be output as it is and for enable signals fe1 to fe3, control signals be0 to be2 for activating the addition of the levels 0 to 2 have only to be output. Hereby, an input data strobe signal IDS and control signals be0, be1 and be2 are respectively input to each input on the left side of the multiplexers 340 to 343. As at this time, addition is executed according to the order of priority as described above, control signals be0, be1 and be2 are not turned at a high level at the same timing and writing does not simultaneously occur in the multiplexers 341, 342 and 343 to which a signal on the same BUSW is input.

Next, as data '0' is input to the shift registers 30 to 33 as described above and the above data '0' is written into the shift register holding only one data and corresponding to the lowest level when a control signal me0 is at a high level, only one of enable signals fe0 to fe3 is turned at a high level. To realize this function, a signal from CT10 is input to the input on the right side of the multiplexer 340, and AND gates 344, 346 and 348 to which signals from CT11 to CT13 and intermediate signals fcs0 to fcs2 are respectively input are respectively connected to the inputs on the right side of the multiplexers 341, 342 and 343 because enable signals fe0 to fe3 are generated based upon signals from CT10 to CT13 showing that each shift register holds one data. As described above, intermediate signals fcs0 to fcs2 are turned at a low level when data is written into the shift registers for the level 0, the level 1 or the lower level and the level 2 or the lower level. Therefore, if data is written into the shift register for a low level even if the shift registers 31 to 33 hold only one data and signals from CT11 to CT13 are at a high level, enable signals fe1 to fe3 are held at a low level by the AND gates 344, 346 and 348. Hereby, this circuit is operated so that data is written into the shift register for the lowest level of the shift registers holding only one data.

As the circuit shown in FIG. 10 is used for generating control signals be0 to be3, for example a control signal be3 depends upon the output of control signals be0 to be2. As a result, the control signal be3 is delayed more than the control signals be0 to be2, when for example, the control signal be3 is turned at a low level and the control signal be0 is turned at a high level in the next cycle of a cycle in which the control signal be3 is at a high level, the control signal be3 and the control signal be0 are both turned at a high level only for a short period represented by the difference in delay time, and output data from the buffers may collide on BUS0 and BUS1. To avoid this, signals from CT20, CT21 and CT22 are respectively input to the inverters 350, 351 and 352 in place of control signals be0 to be2 and may be also used for judging whether the shift register holding two data exists or not. As data in the counter is changed in synchronization with a clock pulse, the difference in delay time can be reduced.

An example that only one of four pairs of data is selected by the buffers $20_0$, $20_1$ to $23_1$ and $23_1$ and output to BUS0 and BUS1 is described above, however, suitable data may be selected via the multiplexer by control signals generated by suitably encoding control signals be0 to be3 using the multiplexer and input to the adder 40. The collision of data on a bus can be avoided owing to the above constitution.

In the above embodiment, an example in which four shift registers, four pairs of buffers each pair of which is constituted by two buffers and four counters are provided to execute the addition of the maximum thee levels, that is, to accumulate the maximum sixteen floating-point numbers is described, however, the addition of a further higher level is enabled by increasing the number of shift registers, pairs of buffers, counters and others. That is, if the maximum N pieces of floating-point numbers are accumulated, m pieces of shift registers, pairs of buffers and counters have only to be provided when $N=2^m$ and $([\log_2 N]+1)$(however, $[\ ]$ denotes Gauss' notation) pieces of shift registers, pairs of buffers and counters have only to be provided when $N \neq 2m$.

Further, in the accumulating circuit according to this embodiment, the multiplexers are switched by a control signal me0 and data '0' is suitably added halfway to accumulate up to the last, however, the accumulated result can be also obtained by changing the number of input data by suitably adding data '0' to input data with a control signal me0 at a low level. That is, accumulation up to the last is enabled by suitably adding data '0' to input data so that the number of input data is 2n pieces. Hereby, as multiplexers and others can be omitted, the scale of the circuit can be further reduced.

As described above, as input data can be accumulated in the order shown in FIG. 3B for example by the accumulating circuit in this embodiment, data input according to this embodiment can be accumulated up to the last.

According to the present invention as described above, as the accumulated result is obtained by extracting and adding two data used for addition at the same level, a large number of data can be accumulated in the range of a small error by the small scale of a circuit.

For example, if data to be accumulated are 7 pieces a1 to a7, the order of floating-point addition is as shown in FIG. 3B. As a result, if the number of data to be accumulated is N (a natural number) and $m=\log_2 N$, the accumulated result includes an error expressed by the following expression:

$$(---((a1 +' a2) +' (a3 +' a4) +' ---+' aN) =$$

$$(---((1 + er)(a1 + a2) +' (1 + er)(a3 + a4)) +' ---) =$$

$$(1 + er)^m a1 + (1 + er)^m a2 + (1 + er)^m a3 + ---+' (1 + er)^m aN.$$

That is, when the accumulated result is expressed by N pieces of precise sums, a relative error of "$(1+er)^m-1$" is evenly included in all N pieces of numbers. If the fixed-point part of a floating-point number consists of p bits, the maximum value of a relative error is $(1+2^{-p})m-1$ and the minimum value is $(1-2^{-p})^m-1$.

FIG. 4 shows the result of comparing a relative error according to the present invention when the fixed-point part of as floating-point number consists of 16 bits with a relative error obtained in the prior example. If the number N of data to be accumulated is approximately one million, a relative error in the prior example is smaller, however, if the number is four million or more, a relative error according to the present invention is smaller and if the number exceeds sixteen million, a relative error in the prior example is ten or more times as large as that according to the present invention.

According to the present invention, two data to be accumulated are stored in an input data storing section and two added result data each of which is obtained by addition at the same level are stored in each added result storing section every addition level. As the added result storing section stores data every addition level, the required minimum number of added result storing sections is equal to the number of addition levels. As one adding means has only to be provided, the scale of a circuit can be reduced.

Figure 11:
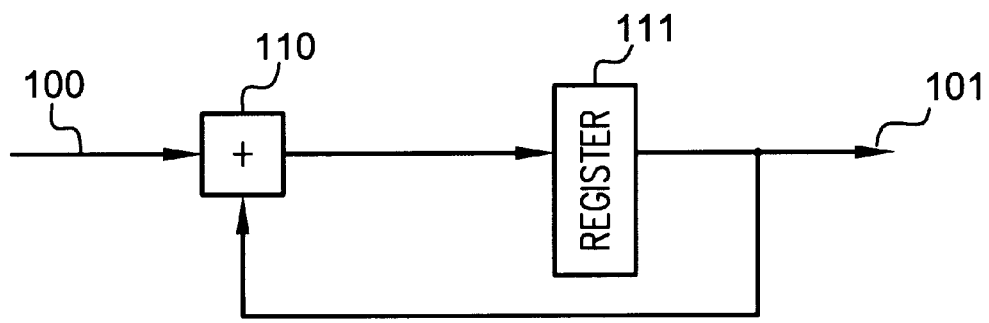
FIG. 11 is a block diagram showing the prior example of the present invention.

As the addition of a different level can be executed while two data are extracted by an input data extracting section, the final accumulated result can be obtained in substantially the same time as in accumulation by the prior circuit shown in FIG. 11.

When the number N of data to be accumulated is not $2^m (N \neq 2m)$, two data used for addition at the same level may not exist, one data may be left, in such a case data is left stored in at least one of an input data storing section and an added result storing section and added result data may not be output from adding means. The above problem can be solved by adding data '0' and inputting data to the adding means.

If two data cannot be extracted by an input data extracting section and only one data is stored in the input data storing section, the one data stored in the input data storing section and data '0' added from an external device can be extracted by a stored data extracting section and input to the adding means by adding data '0' to the input data extracting section from the external device.

Similarly, if two data cannot be extracted by an added result extracting section and only one data is stored in the added result storing section, one data stored in the added result storing section and data '0' added from an external device can be extracted by the stored data extracting section and input to the adding means by adding the data '0' to the added result extracting section from the external device.

If only one data is stored in the added result storing section the addition level of which is high, inputting two data '0' to the added result extracting section from an external device and storing the two data '0' in the added result storing section the addition level of which is lower are repeated. Hereby, added result data is shifted to the added result storing section the addition level of which is higher and when the added result data is shifted to the same level as the addition level of the added result storing section in which only one data is stored, the one data stored in the added result storing section and the shifted data '0' are extracted by the stored data extracting section and input to the adding means.

A case in which if data '0' is input to the adding means, the data '0' is directly added to the input data extracting section or the added result extracting section from an external device is described above, however, as input data is input to the added result extracting section via the adding means, data '0' may be also added to the added result storing section via the adding means without directly adding the data '0' to the added result extracting section from an external device by adding two data '0' to the input data extracting section and outputting the data '0' from the adding means. In this case, data '0' the addition level of which is enhanced as described above may be also stored in the added result storing section by repeating adding the data '0' two at a time to the input data extracting section.

According to the present invention as described above, as data '0' can be input to either or both inputs of the adding means if necessary, effect that the final accumulated result can be obtained based upon left data without enlarging the scale of a circuit even when the number of data is not the power of two can be obtained.

If plural states in each of which either of two data to be extracted does not exist exist, data '0' should be used for data the addition level of which is lower.

According to the present invention, as addition the frequency of appearance of which is high is preceded when input data is accumulated, effect that a storing section for storing the result of the addition of the higher level is not required to be provided and the scale of a circuit in the added result storing section for storing the accumulated result can be minimized can be obtained.

According to the present invention, as plural data simultaneously input are simultaneously accumulated, effect that the accumulated result can be output in substantially the same time as time required for input can be obtained.

What is claimed is:

1. A floating-point accumulator for accumulating data represented by a floating point number, comprising:

input means for inputting input data to be accumulated;

adding means for adding a first pair of data and outputting the added first pair of data as added result data; and data added order changing means for receiving the input data to be accumulated from the input means and the added result data, obtaining a second pair of data at a same addition level from at least one of the input data to be accumulated and the added result data, and inputting the second pair of data to the adding means as the first pair of data.

2. A floating-point accumulator according to claim 1, wherein the data added order changing means comprises:

an input data extracting section for extracting a third pair of data from the input data to be accumulated;

an input data storing section for storing the third pair of data extracted by the input data extracting section;

an added result obtaining section for obtaining a fourth pair of data from the added result data;

plural added result storing sections for storing the fourth pair of data obtained by the added result obtaining section for every addition level; and a stored data retrieving section for retrieving the second pair of data from at least one of the input data storing section and the plural added result storing sections and inputting the second pair of data to the adding means.

3. A floating-point accumulator according to claim 2, wherein if at least one piece of data of the second pair of data does not exist, at least one piece of data of the second pair of data uses data '0' in place of the data which does not exist.

4. A floating-point accumulator according to claim 2, wherein the stored data retrieving section retrieves the second pair of data, giving priority to addition at a lower addition level.

* * * * *